W. TEAMER.
Sausage-Stuffing Machine.
No. 214,472.  Patented April 15, 1879.
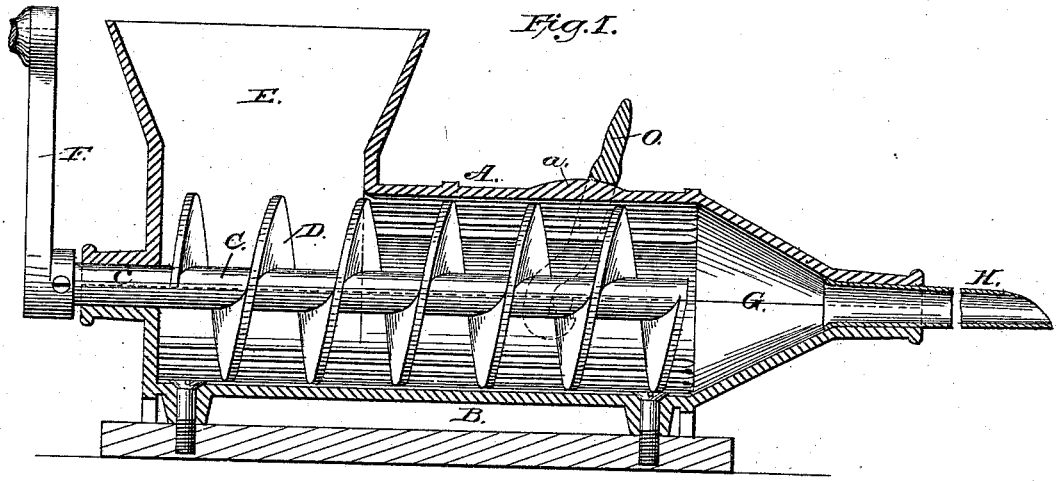
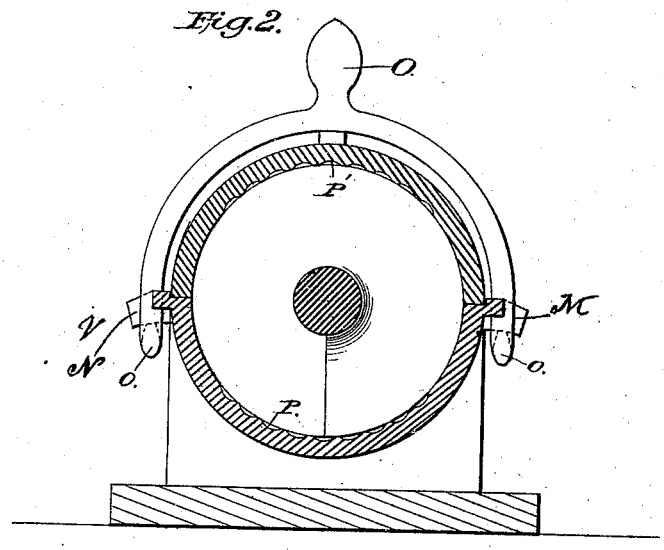
WITNESSES
INVENTOR
William Teamer
By H. J. Ennis
ATTORNEY

UNITED STATES PATENT OFFICE.

WILLIAM TEAMER, OF EVANSVILLE, INDIANA.

IMPROVEMENT IN SAUSAGE-STUFFING MACHINES.

Specification forming part of Letters Patent No. 214,472, dated April 15, 1879; application filed February 11, 1879.

*To all whom it may concern:*

Be it known that I, WILLIAM TEAMER, of Evansville, in the county of Vanderburg and State of Indiana, have invented certain new and useful Improvements in Sausage-Stuffing Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a sectional side elevation of a sausage-filler embodying the improvements of my invention, and Fig. 2 is a sectional elevation through its diameter.

This invention has relation to machines for filling sausage-skins; and it consists of certain improvements in the construction of the same, hereinafter more fully described, and particularly pointed out in the claims.

In the accompanying drawings similar letters of reference indicate like parts of the invention.

A and B are the upper and lower parts, forming a circular casing or box, inclosing the shaft C, provided with the Archimedean screw D. The upper half, A, has a hopper, E, at its rear end. The shaft C has a bearing, c, in the back of the machine, and extends through the casing far enough to attach a handle, F, by means of which the machine is operated. The diameter of the screw D is the same as the internal diameter of the machine, which is uniform for the full length of the screw, beyond that it is conical at G, and terminates in the tapering spout H. The lower half, B, of the casing is provided about midway of its length with two projections or teats, M and N. A semicircular spanner or clamp, O, encircles the upper half, A, coming in contact with it at the incline *a*, and the hooks *o o* on its ends engage the projections M and N, serving to lock the casings A and B firmly and securely together.

The inner sides of the casings A and B are provided with longitudinal semicircular corrugations P and P', which serve as guides, and facilitate the passage of the contents of the machine.

The operation of the machine is as follows: The sausage-meat, being fed into the hopper E, is received and forced along by the screw D, the operation being greatly assisted by the corrugations P and P'. When the mass reaches the cone end G it is very tightly packed, and in this condition is forced into the skins through the spout H. This operation is performed in a perfect manner, absolutely preventing the admission of air into the skins, thus obviating a fault common to the ordinary sausage-filling machines in use.

Having thus described my invention, what I claim as new and useful, and desire to secure by Letters Patent of the United States, is—

1. In a sausage-filler, the Archimedean screw D, provided with the shaft C, having the single journal *c*, and handle F, in combination with the divided casings A B, having projections M, N, and *a*, and the semicircular clamp O, provided with the hooks *o o*, substantially as and for the purpose set forth.

2. In a sausage-filler, the casings A and B, having longitudinal corrugations P and P', and conical end G, in combination with the screw D, shaft C, and handle F, substantially as and for the purpose described.

In testimony that I claim the foregoing as my own I hereunto affix my signature in presence of two witnesses.

WILLIAM TEAMER.

Witnesses:
R. C. WILKINSON,
JOHN LENIHAN, Jr.